(12) United States Patent
Patra et al.

(10) Patent No.: US 7,430,208 B1
(45) Date of Patent: Sep. 30, 2008

(54) EFFICIENT METHOD FOR PACKET SWITCHING ON ASYNCHRONOUS TRANSFER MODE SWITCH BASED PLATFORMS

(75) Inventors: Abhijit Patra, Santa Clara, CA (US); Samar Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 654 days.

(21) Appl. No.: 10/940,098

(22) Filed: Sep. 14, 2004

Related U.S. Application Data

(63) Continuation of application No. 09/685,329, filed on Oct. 5, 2000, now Pat. No. 6,816,489.

(51) Int. Cl.
*H04L 12/28* (2006.01)

(52) U.S. Cl. .................................. 370/395.1

(58) Field of Classification Search ................ 370/351, 370/389–393, 395.1, 397–399, 395.3–395.32, 370/395.71–395.72, 419, 428, 429; 709/238
See application file for complete search history.

(56) References Cited

U.S. PATENT DOCUMENTS

| | | | |
|---|---|---|---|
| 5,555,256 A | 9/1996 | Calamvokis | 370/60.1 |
| 5,666,361 A | 9/1997 | Aznar et al. | 370/392 |
| 5,790,545 A | 8/1998 | Holt et al. | 370/398 |
| 5,822,319 A | 10/1998 | Nagami et al. | 370/392 |
| 5,828,667 A | 10/1998 | Sugawara | 370/392 |
| 5,852,606 A * | 12/1998 | Prince et al. | 370/395.53 |
| 5,872,783 A * | 2/1999 | Chin | 370/395.32 |
| 5,917,819 A | 6/1999 | Yang et al. | 370/390 |
| 5,999,531 A | 12/1999 | Ferolito et al. | 370/390 |
| 6,032,190 A * | 2/2000 | Bremer et al. | 709/238 |

(Continued)

OTHER PUBLICATIONS

Slimane. Signaling in IP Cell-Switching, Computer and Communications, IEEE, 1999, pp. 116-120.*

(Continued)

*Primary Examiner*—Dmitry Levitan
(74) *Attorney, Agent, or Firm*—Campbell Stephenson LLP

(57) ABSTRACT

An apparatus and method of using same for associating a tag with each packet in an ATM switch to eliminate the need for an OVC table, thus saving both egress processing time and memory resources. The tag includes both a type of switching identifier and a per-logical-interface or per-external-VC information field. A packet received by the egress packet processing engine has associated with it (by the control plane) a frame control word containing a new cell header (NCH) corresponding to the OVC on which the packet was received from the fabric. This NCH contains the tag used to expedite egress processing. In one embodiment of the present invention, the tag value is provided in two fields, a tag type and a tag parameter. The tag type represents a code for different data path applications. The tag parameter takes on multiple values based on the tag type. The present invention efficiently uses the OVC to NCH mapping to map many OVCs to a small set of tags coded within the switch's NCH so that, rather than having to do an extra look-up in the egress engine in a large and non-scaleable OVC table, the egress engine has only to look in a small, fully-scaleable tag table. In fact, in one embodiment, no egress look-up is required at all.

29 Claims, 5 Drawing Sheets

U.S. PATENT DOCUMENTS

| | | | | |
|---|---|---|---|---|
| 6,094,685 | A | | 7/2000 | Greenberg et al. .......... 709/227 |
| 6,101,187 | A | | 8/2000 | Cukier et al. ............... 370/396 |
| 6,104,713 | A | | 8/2000 | Nagami et al. .............. 370/392 |
| 6,128,666 | A | * | 10/2000 | Muller et al. ............... 709/238 |
| 6,188,686 | B1 | * | 2/2001 | Smith ......................... 370/388 |
| 6,560,227 | B1 | * | 5/2003 | Bartoldus et al. ........... 370/390 |
| 6,633,565 | B1 | | 10/2003 | Bronstein et al. ........... 370/392 |
| 6,643,260 | B1 | | 11/2003 | Kloth et al. ................. 370/235 |
| 6,647,428 | B1 | | 11/2003 | Bannai et al. ............... 709/245 |
| 6,658,006 | B1 | * | 12/2003 | Chen et al. ............... 370/395.1 |
| 6,785,734 | B1 | * | 8/2004 | Blasiak et al. .............. 709/238 |

OTHER PUBLICATIONS

Paul Doolan et al., "*MPLS Using LDP and ATM VC Switching*", Internet Draft, Jun. 2000, pp. 1-17.

Paul Doolan et al., "*Use of Label Switching With ATM*", Internet Draft, Jul. 1998, pp. 1-14.

Bruce Dane et al. "*Use of Tag Switching With ATM*", Internet Draft, Jan. 1997, pp. 1-10.

I. Widjaja; and A. Elwalid, "*Performance Issues In VC-Merge Capable ATM LSRs*," RFC 2682, Sep. 1999, pp. 1-10.

Harry J.R. Dutton and Peter Lenhard, "*Asynchronous Transfer Mode (ATM) Technical Overview*", IBM second edition, 1995, pages include: Cover page, Copyright page, Chapter 7, Bibliography, and Back page.

Faten Ben Slimane and Guy Pujolle, "Signaling In IP Cell-Switching", Computer and Communications, 1999 Proceedings. IEEE International Symposium on Jul. 6-8, 1999, pp. 116-120.

* cited by examiner

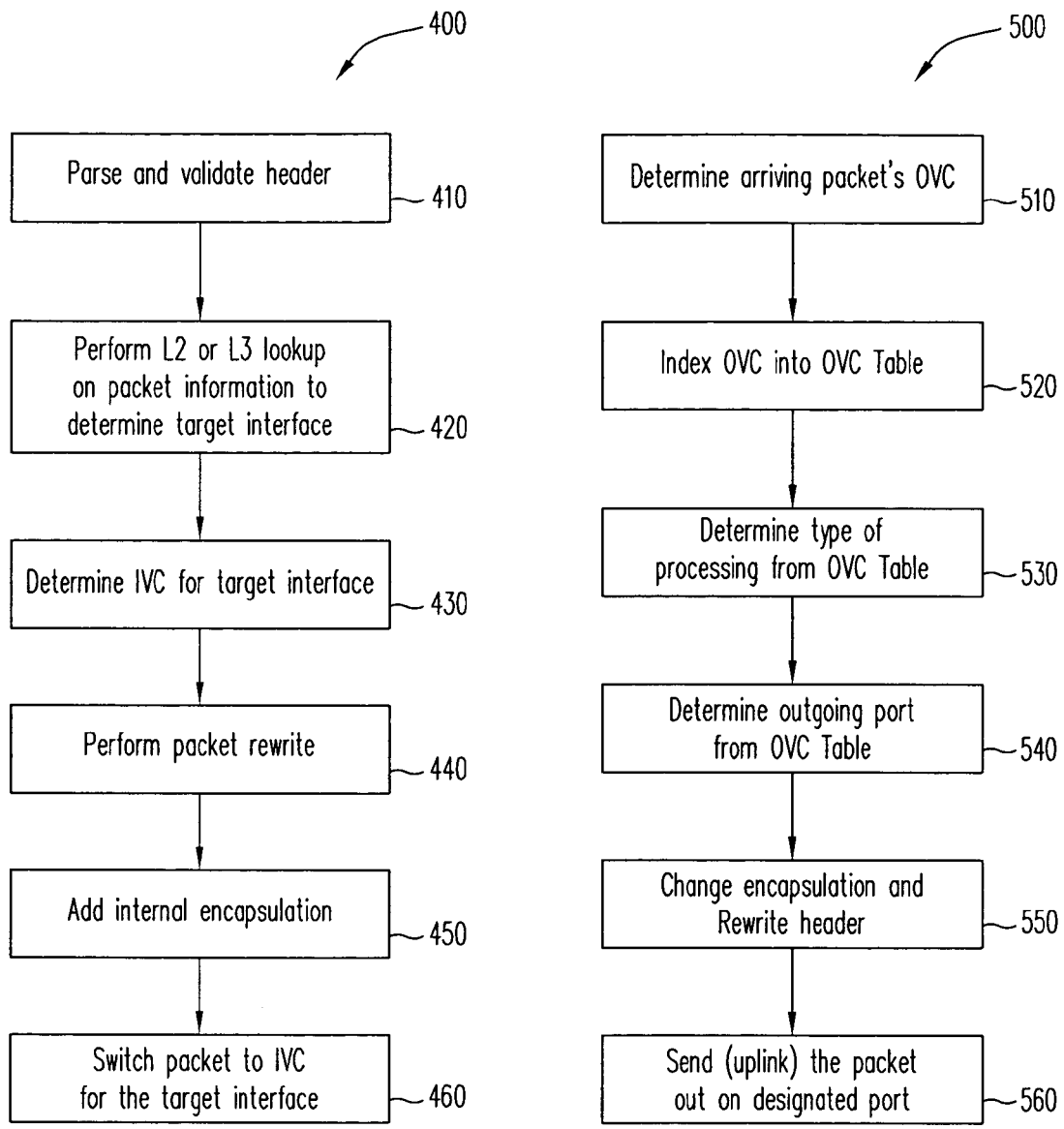
FIG. 4 (Prior Art)
FIG. 5 (Prior Art)
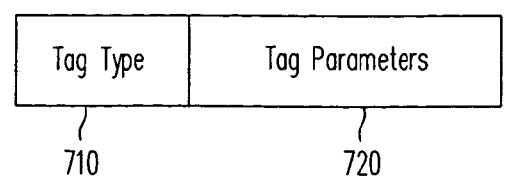
FIG. 7

EFFICIENT METHOD FOR PACKET SWITCHING ON ASYNCHRONOUS TRANSFER MODE SWITCH BASED PLATFORMS

CROSS-REFERENCE TO RELATED APPLICATIONS

This application is a continuation of U.S. patent application Ser. No. 09/685,329, entitled "Efficient Method For Packet Switching On Asynchronous Transfer Mode Switch Based Platforms", filed Oct. 5, 2000 now U.S. Pat. No. 6,816,489, and naming Abhijit Patra and Samar Sharma as inventors. This application is assigned to CISCO TECHNOLOGY, INC., the assignee of the present invention, and is hereby incorporated by reference, in its entirety and for all purposes.

BACKGROUND OF THE INVENTION

1. Field of the Invention

The present invention relates to communication switching methods, in particular packet switching on platforms using an asynchronous transfer mode (ATM) fabric.

2. Description of the Related Art

Many devices, such as layer 2 switches (sometime referred to as bridges) and layer 3 switches (sometime referred to as routers), are being developed based on asynchronous transfer mode (ATM) switch architectures. In an ATM switch, the data enter the device through an ingress port, are switched through an ATM switch fabric, and exit the device through an egress port. Both the ingress and egress ports, as presently known in the art, perform a certain amount of intelligent packet processing and datapath switching functions. Since a typical ATM switch device has multiple input/output ports, the ports are usually grouped together on physical linecards or I/O modules. In some literature, these linecards are referred to as port adapters. Each linecard contains several physical connections to the network and the associated control and processing circuits necessary to manage the logical ports representing the physical network connections. The linecard is also connected to the switch fabric within the switch, and thereby connected to every other linecard in the switch.

One logical element of a model ATM switch, known as the control plane, consists of routing protocol, configuration, and management subsystems. The control plane is typically implemented as part of a central routing processor. It may also be implemented in a distributed or pipelined processing architecture through a shared message-passing interface or similar logical structure known in the art. The term "control plane" can also describe a logical combination of subsystems that defines a central route processor. Regardless of configuration, the control plane establishes the internal connections between ingress and egress ports that provide "any to any" switching.

The organization and terminology used to describe ATM switches is further explicated in Chapter 15 of Roger L. Freeman, *Telecommunication System Engineering*, 3d ed. (1996), incorporated herein by reference in its entirety. Further technical explanation of ATM networks and switching is to be found in H. J. R. Dutton and P. Lenhard, *Asynchronous Transfer Mode (ATM) Technical Overview* (2d ed. 1995); Othmar Kyas, *ATM Networks* (1995); and W. A. Flanagan, *ATM User's Guide*, (1995), all of which are incorporated herein by reference.

The basic communication unit within the Asynchronous Transfer Mode protocol is the cell. An ATM cell is 53 octets in length, and includes a header and a payload. The cell header occupies 5 octets and the remaining 48 octets are reserved for the payload. The cell destination is identified by a Virtual Path Identifier/Virtual Connection Identifier ("VPI/VCI") located in the header. The VPI is either 8 or 12 bits in length, depending on whether the link is a Network to Network Interface ("NNI") or a User Network Interface ("UNI"). The VCI is 16 bits in length. Thus, the VPI and VCI collectively provide a 24 or 28 bit address.

Supporting the total number of connections defined by the VPI/VCI address space would be impractical for most commercial ATM switch applications due to large memory requirements and attendant costs. For this reason, it is common practice to translate the VPI/VCI address space to a smaller address space by address translation techniques. In typical ATM switches, the incoming VPI/VCI address is translated into a smaller, local address space whose width defines the number of connections supported by the switch. This internal-to-the switch, local address is the Incoming Virtual Circuit number or IVC. The cell is directed to one or more ports within the switch based on the IVC. In an output process, a remapping is executed to define an outgoing VPI/VCI address for the cell.

Remapping the outgoing VPI/VCI becomes memory intensive when supporting multicast operation since a single incoming VPI/VCI may spawn multiple VPI/VCIs for transmission. For example, if an ATM switch includes 14 linecards, each having 8 I/O ports, it is possible that one input may spawn 112 outputs. It is theoretically possible to employ a lookup table at each port to remap the outgoing address to the proper destination VPI/VCI. However, such an architecture would be impractical since it would require an inordinately large amount of memory. A more efficient technique for handling multicast cells would therefore be of benefit.

As discussed above, packets of data (also called "cells" in ATM literature) are sent from the ingress port on an internal connection to one or more egress ports, also known as egress interfaces. (In ATM terminology, the terms "port" and "interface" are interchangeable and refer to the external network connection to or from the switch.) There are typically two logical components to the internal connection in an ATM switch. The logical part of the connection between the ingress port and the switch fabric is the incoming virtual circuit (IVC) discussed above. The logical part of the connection between the switch fabric and egress port is called the outgoing virtual circuit (OVC). And, as noted above, an internal connection could be one of two types: a point-to-point connection or a point-to-multipoint connection. The IVC associated with a point-to-multipoint connection is known as a "root" and the corresponding set of (multipoint) OVCs are termed "leaves".

Each egress port then makes its own decision on how to send the packet out of the switching device. For example, egress port processing determines the outgoing (or "uplink") VPI/VCI on which to send the packet out of the switch. The egress port also decides the type of encapsulation (e.g., UNI or NNI) to use on the outbound packet based on which virtual LAN (VLAN) or external VC that the packet is to use to leave the switch.

Packet processing is thus distributed between both the ingress and egress ports. The ingress processing tasks include packet parsing, header validation, and address look-up at OSI layer 2 and/or layer 3, as commonly known and used in the art. The layer 2/3 address look-up task determines the next hop (i.e., the path denoted by the uplink VPI/VCI to the next switch or the final packet destination) that the packet will take. This determination also determines the egress interface or port. Since the processing power in both the ingress and egress interfaces is limited, it is important to avoid duplicating processing efforts between the ingress and egress sides of the switch.

In the case of broadcast or multicast traffic, the packet replication necessary to send one packet to multiple destinations is typically performed in the switch fabric. However, since the encapsulation and processing of each packet for a particular outbound interface is unique to each outbound interface, the ingress processing is unable to determine a priori all of the necessary encapsulations for broadcast/multicast packets. In other words, it is not possible for the ingress side to convey all of the necessary forwarding information to the egress side. This means that, for broadcast/multicast packets, the egress interface has to determine at least some of the forwarding information based on information presented to it by the switch fabric.

One approach to egress processing of multicast cells previously used in the art maintains an outgoing virtual circuit table at the egress interface. This OVC table is used by the egress interface to look-up the parameters required for egress processing. U.S. Pat. No. 5,666,361, "ATM Cell Forwarding and Label Swapping Method and Apparatus" to Aznar, et al., incorporated herein by reference in its entirety describes one approach to this problem.

As noted above, the main function of an ATM switch is to receive incoming ATM cells (or "packets" of data, generally) at the input ports of one or more port adapters (linecards) and to redirect those cells to specific output ports (on the same or different linecards) for transmission into the surrounding network. Each cell includes a header containing routing information in the form of a Virtual Path Identifier (VPI) field and a Virtual Cell Identifier (VCI) field. The ATM switch reads these fields in each received cell and performs a table look-up operation in the input port adapter (also known as the ingress linecard) in order to locate the target output adapter for the particular cell. This ingress look-up also determines new VPI/VCI values that are to be written (swapped) into the cell header for use by the next ATM switch along the cell's route.

In some prior art ATM switches, the ingress look-up is performed entirely at the ingress linecard and all information obtained, including the target output port identification and the new VPI/VCI values, must be transferred through the ATM switch to the appropriate output (egress) linecard. In some prior systems, the new VPI/VCI values are written into the cell header before the cell is transferred through the switch fabric to reduce the amount of additional information that must be transferred. An example of such a system is described in W. Fischer et al, "A Scalable ATM Switching System Architecture", *IEEE Journal on Selected Areas in Communication*, Vol. 9, No. 8, October 1991, pages 1299-1307, incorporated herein by reference in its entirety.

Depending on packet Quality of Service (QoS) or other packet handling requirements (as currently understood in the art), a cell may need to be directed to one of several specialized egress port queues having specific management and scheduling properties. In fact, the output (egress) port processing requirements for a given cell may be different than that at the input (ingress) port. For example, a class Y VCC connection on a port $P_i$ of a particular input adapter may be aggregated with other such connections into a class A VPC connection on port $P_j$ of an output adapter. Such a case can occur when connecting a Local Area Network (LAN) to a Wide Area Network (WAN) through the ATM switch.

Also known in the prior art is the use of a second look-up table at the output (egress) linecard. Performing an egress table look-up permits cells to be queued on the basis of their QoS properties. It also permits additional or different cell processing operations to be performed on the ingress and egress sides of the switch fabric and, additionally, the assignment of new ATM headers to a switched cell to support multicasting.

FIG. 1 shows the components of a typical ATM switch. A switch fabric 100, capable of switching cells from any of a number of input/output (I/O) leads to any other of such leads, is connected to a switch controller 151 through leads 111 and 113 and to a linecard 102 through leads 103 and 105. Additional linecards, such as linecards 104 and 106, are typically similarly connected to the switch fabric 100 through similar leads (not illustrated). Switch controller 151 includes a control processor 150, which may be a microprocessor. The control processor is connected through a DMA transfer controller 152 to a queuing controller 154 used for queuing data to be delivered to the switch fabric 100 over lead 113. The queuing controller 154 is connected to a processor 158 used to provide ATM layer handling for the queued data. The operations performed by queuing controller 154 and ATM layer processor 158 make use of random access memory (RAM) elements 162 and 166, respectively. Data received from switch fabric 100 over lead 111 is received in a second queuing controller 156 connected both to the DMA transfer controller 152 and to an ATM layer processor 160. The queuing controller 156 and ATM layer processor 160 make use of RAM 164 and 168, respectively.

One of the primary functions of linecards, such as linecard 102, is to concentrate traffic received on a number of ATM ports so that standard ATM cell processing functions, including an ATM Transmission Convergence (TC) sublayer function, can be performed in the switch. The number of linecards that can be included in the switch is a function of the size of the switch fabric 100. Linecard 102 includes a multiplexer 110 for concentrating cells received from different ones of ATM input ports 130 at the ATM UNI (User-to-Network Interface) interface and a de-multiplexer 120 for distributing ATM cells destined for different ones of ATM output ports 131, also at the ATM UNI interface. Different media (such as copper wire or optical fiber) may be used to carry ATM cells. To accommodate the differences in media, physical media-dependent interface circuits 136 and 137 are connected to the multiplexer 110 and demultiplexer 120, respectively. Like the switch controller 151, linecard 102 includes queuing controllers 112 and 122 for ATM data being delivered to and received from the switch fabric 100. Linecard 102 also includes ATM layer processors 116 and 126 for performing ATM layer functions on incoming and outgoing ATM packets. Buffers 112 and 122 are connected to RAM elements 114 and 124, respectively, while the ATM layer processors 116 and 126 are connected to RAM elements 118 and 128, respectively.

In the described arrangement, ATM data received at any of the input ports 130 on linecard 102 can be exchanged with the control processor 150 or with any of the output ports 131 on linecard 102 or corresponding output ports on other linecards, such as linecards 104 and 106.

The ATM switch implementation described above is illustrative of an environment in which the present invention may be implemented. The invention can also be implemented in a more highly integrated system, such as a system in which the control processor and adapter function are integrated into a single device, or in a system using a switching element other than the normal ATM switch fabric. An example of an alternative switch would be a bus.

FIG. 2 describes the paths taken by incoming data received at one of the input ports of linecard 102 in another prior art ATM switching system. In this system, ingress and egress linecards (the port adapters) each contain processing engines that read, process, and rewrite packet information.

The cell follows a path 200 to a specific cell buffer 240 in RAM 114. Source port information SP is delivered to the ATM layer processor 116 on a path 202 along with the ATM header of cell stored in buffer 240 to enable processor 116 to perform the necessary ingress table look-up operation. In a standard ATM cell, the source port information SP is encoded in four bits in the cell while the VPI/VCI fields occupy twenty-eight bits, yielding a thirty-two bit input pattern for the ingress table look-up operation.

The ingress look-up result is the connection identifier (i.e., the incoming virtual circuit identifier, IVC) for the cell. The controller 116 accesses a connection control block address (path 204) in the RAM 118 using the IVC as an index to identify the path to the target (egress) linecard and the proper port on the egress linecard. This lookup, which is performed by the control plane, associates an Outgoing Virtual Circuit (OVC) with the IVC in a table structure maintained by the control plane. The controller also retrieves and stores, in some systems, a field identifying the class of traffic to which the cell belongs. Examples of different classes of traffic are the different Qualities of Service considered standard in ATM technology. As noted above, different classes of traffic can require different processing operations.

The cell is forwarded along a path 210 to switch fabric 100, which uses the IVC and OVC information stored in the control plane to forward the cell to the egress linecard 104.

Once at the egress linecard 104, the cell is written into a cell buffer 250 in RAM 124. IVC, source port information, and ATM header information are extracted from the contents of cell buffer 250 and directed to the ATM layer processor 126 along a path 212. Using this information (and especially the OVC from the control plane), the ATM layer processor 126 performs the egress look-up operation. Using the OVC, the processor 126 accesses the appropriate address in RAM 128 (i.e., from the control plane) to retrieve the uplink VPI/VCI and any additional processing parameters. This RAM space is referred to as the OVC table. Specifically, the retrieved information includes the VPI and VCI values which control the transfer of the cell to a particular egress port $P_j$ and swap control information, such as whether the connection is a VCC (Virtual Channel Connection) or VPC (Virtual Path Connection) and whether the port is a UNI (User-to-Network Interface) or a NNI (Network-to Network Interface).

The information resulting from the egress look-up is forwarded to a label swap function 220 along path 216. The label swap function retrieves the original cell header, including the original VPI and VCI information, from RAM 124 and generates a new cell header (NCH) in accordance with the swap controlling information. The new cell header is written back into the cell buffer 250 along a path 222. The cell, with its newly-modified header, is forwarded to the egress port $P_j$ through the appropriate queue and demultiplexer.

The OVC table size is limited because of the relative scarcity of memory available to support each egress port in a switch, since switches typically contain many ingress and egress ports. This memory limitation puts a restriction on the number of OVCs terminating on a particular egress linecard since each OVC obviously requires a unique virtual circuit identifier (VCI). Typically, the OVC table memory allocation becomes exhausted even before the switch fabric's IVC and OVC capability is completely utilized.

This memory limitation poses a number of problems. Firstly, present designs lack the necessary scalability to support ever increasing needs for L2 bridge group and L3 multicast group support on a given number of external ports. For example, on a switch that supports n bridge groups and p ports, the egress OVC table could have up to (n*p) entries. Furthermore, if the egress port is a ATM uplink which supports m external VCs, then the OVC table must be of a size (m*p). Thus, for a platform that has 256 ports and an ATM uplink (i.e., the egress port to external network connection) that supports 8 K external VCs, the OVC table for the ATM uplink needs to have 2 M entries. One switching device currently in use today, however, incorporates a memory allocation for the OVC table of only 4 K entries.

In addition to the memory size limitation, there is an ancillary problem created by the fact that egress port processing requires an external memory reference to the OVC table to perform the look-up. As the table size necessarily grows, the number of bits for required in the memory reference increases, thus expanding the general processing overhead.

What is needed is a packet processing approach for ATM switching that is scalable to accommodate a continuously increasing demand for a multicast and broadcast group addressing without incurring the memory limitations noted above.

SUMMARY

The present invention provides an egress tag for each packet to facilitate layer 2 and layer 3 switching and processing and eliminates the need for an OVC table, thus saving both processing time and memory resources. This tag includes both a type of switching identifier and a per-logical-interface or per-external-VC information field. The relevant information is determined not based upon each unique VCI but on each unique root IVC entering the switch fabric. In other words, the tag information is not based on or replicated from an OVC table; unique VCIs are not assigned to each leaf terminating on an interface as long as the type of switching is the same. The uplink VCI from one egress interface to another only differs if the complete tuple [type of switching, terminating interface] is different. For any particular type of switching, the maximum number of uplink VCIs required is the maximum number of interfaces supported by the system. This essentially reduces the number of unique VCIs required for each physical interface by a large factor. However, the number of VCIs required is still determined by the product of the number of switching applications and the number of interfaces.

A packet received by the egress packet processing engine, according to one embodiment of the present invention, also has associated with it (by the control plane) a frame control word containing a new cell header (NCH) corresponding to the OVC on which the packet was received from the fabric. This NCH (which is, in one embodiment, a 16-bit field) contains the information required for egress processing.

The NCH is presented in two fields, a tag type and a tag parameter. The tag type, which is in one embodiment of the present invention a 4-bit field, represents a code for different data path applications. The tag parameter is (in one embodiment) a 12-bit field which can assume multiple values based on the tag type.

Using this method, the egress packet processing engine no longer needs to perform a look-up on an OVC table to determine how to process and encapsulate an outbound packet. In fact, an OVC table is not required. The egress engine now simply reads the new cell header associated with each OVC and uses the information in the NCH to determine packet encapsulation. The number of bridge groups and the number of multicast groups supported by the switching device is no longer limited by the size of the OVC table. Only the switch fabric connection resources (i.e., the ability of the switch fabric to replicate packets to multiple destinations in a broadcast/multicast mode) determines the capacity of the device.

The present invention efficiently uses the OVC to NCH mapping to map many OVCs to one of a small set of tags that is then coded within the switch's NCH. Rather than having to do an extra look-up in the egress engine in a large and non-scaleable OVC table, the egress engine now has only to look in a small, full-scaleable NCH table. In fact, in an alternate embodiment, no egress look-up is required at all.

BRIEF DESCRIPTION OF THE DRAWINGS

The present disclosure may be better understood and its numerous features and advantages made apparent to those skilled in the art by referencing the accompanying drawings.

FIG. 4 is a flowchart of a prior art method of ingress processing.

FIG. 5 is a flowchart of a method of egress processing as currently known in the art.

FIG. 7 is a schematic of the structure the OVC tag format, according to one embodiment of the present invention.

The use of the same reference symbols in different drawings indicates similar or identical items.

DETAILED DESCRIPTION

Apparatus

Figure 1:
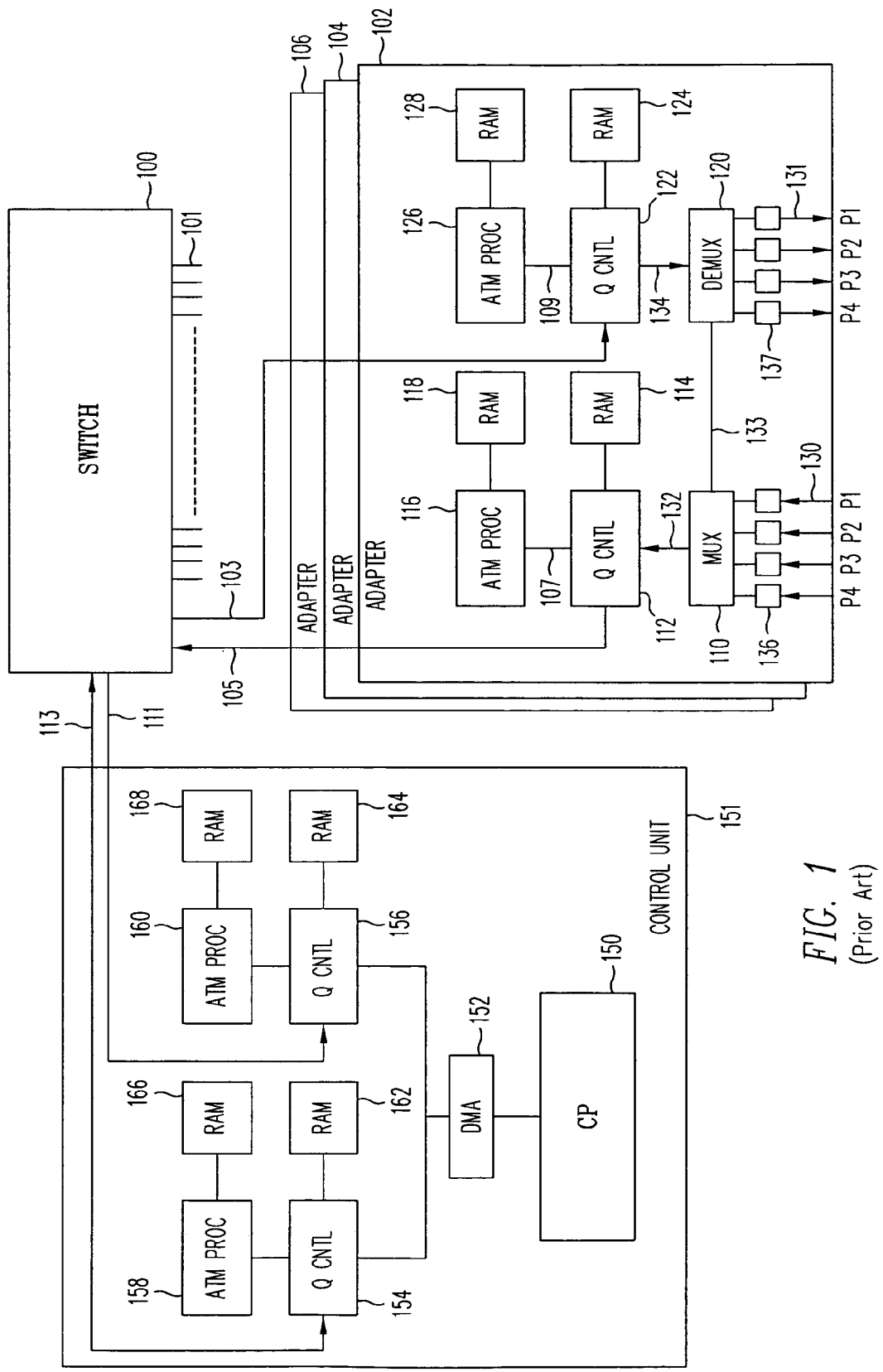
FIG. 1 is a high-level schematic of a prior art ATM switching device.
Figure 2:
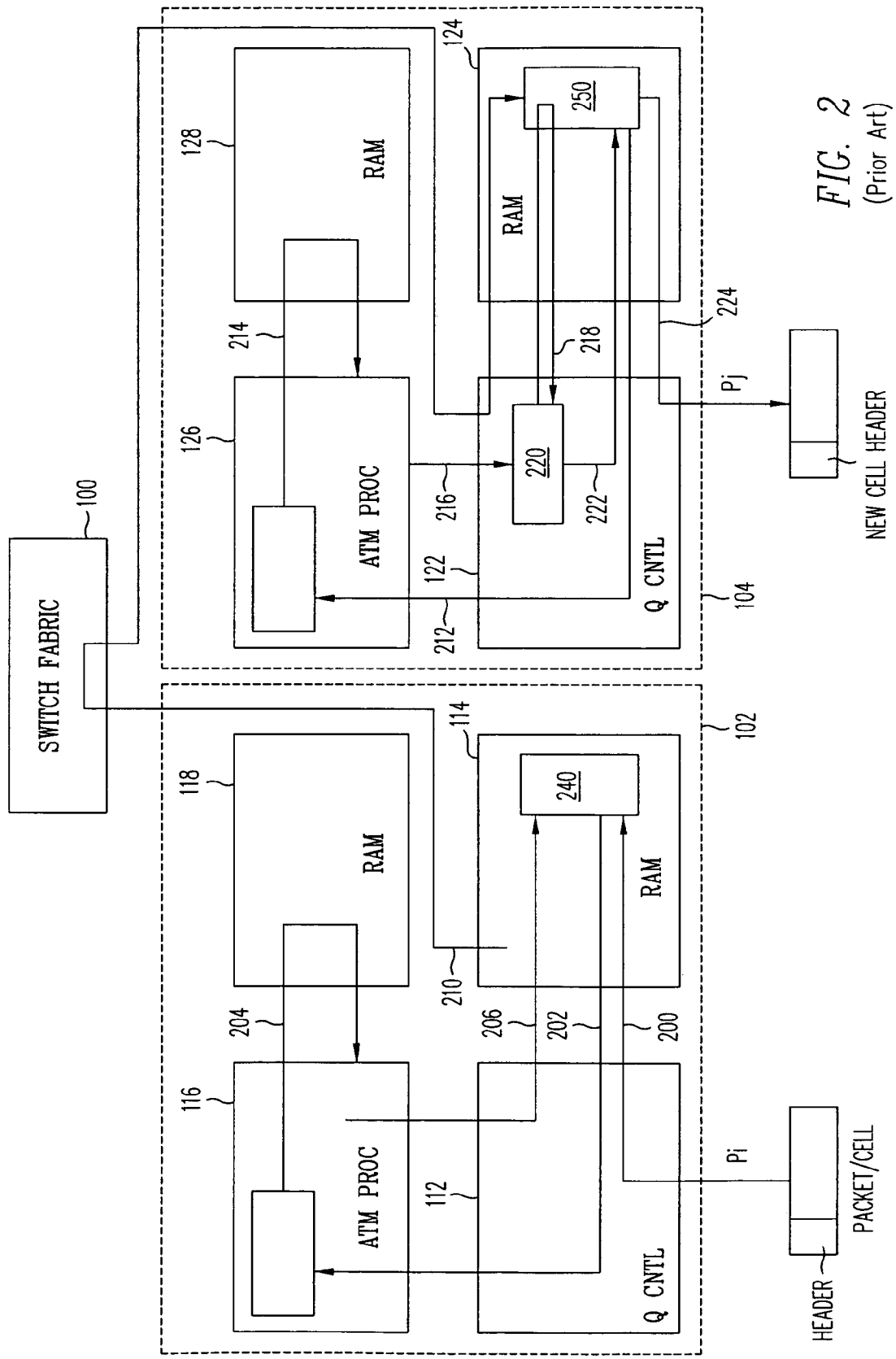
FIG. 2 is a high-level schematic of a variation on an ATM switching device, also known in the art.
Figure 3A:
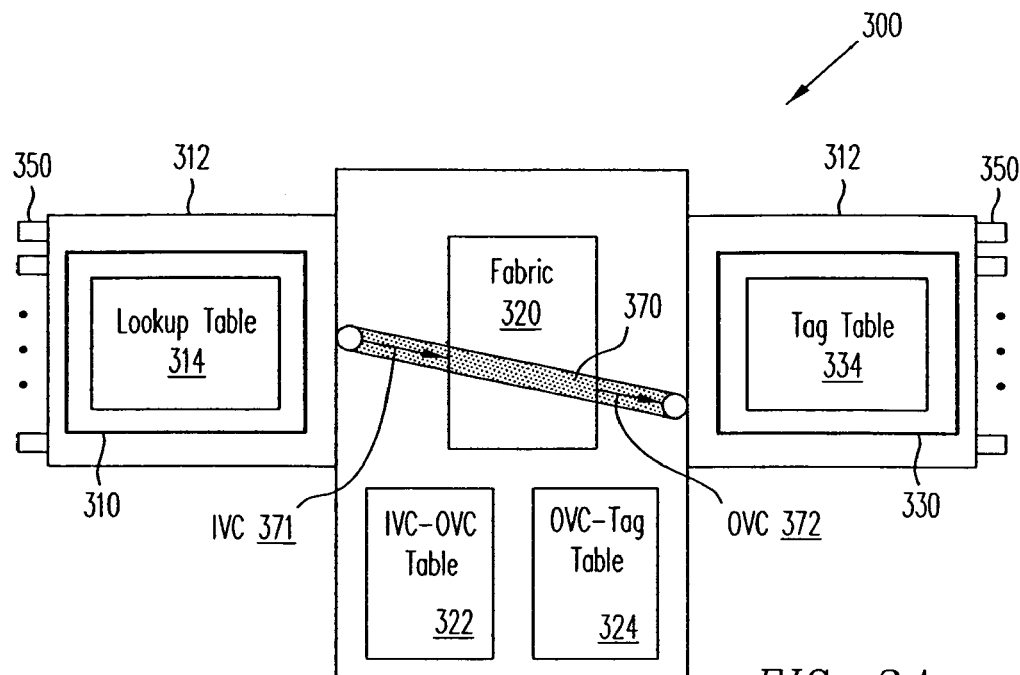
FIG. 3A is a high-level schematic of a switching device using an ATM switch fabric according to one embodiment of the present invention, showing a point to point internal connection path.

FIG. 3A shows, at a high level, a switching device 300 comprising ingress packet processing engine 310 (part of an otherwise conventional ATM switch linecard 312), an ATM switch fabric 320, and egress packet processing engine 330. Egress engine 330 is likewise part of an otherwise conventional linecard 312. Both ingress engine 310 and egress engine 330 may be present on the same otherwise-conventional linecard 312 in some embodiments of the present invention; they may also be implemented on separate ingress and egress linecards.

Each linecard 312 contains a plurality of physical connections 350 to the external network.

Within ingress packet processing engine 310, packet reception is performed in accordance with well-known, industry standard methodologies not further discussed herein. Switch fabric 320 contains well-known apparatus for replicating broadcast and multicast packets, also not further discussed herein.

Path 370 shows (schematically) the internal routing/switching connection between an ingress port logically connected to ingress engine 310, through switch fabric 320, to an egress port logically connected to egress engine 330. The connection (path 370) in FIG. 3A is a point to point unicast virtual connection: it has only one destination port. The connection denoted by path 370 in turn consists of a logical portion comprising the path from ingress engine 310 into fabric 320, incoming virtual circuit (IVC) 371. Path 370 also includes a logical portion comprising the path from fabric 320 to egress engine 330, outgoing virtual circuit 372.

Figure 3B:
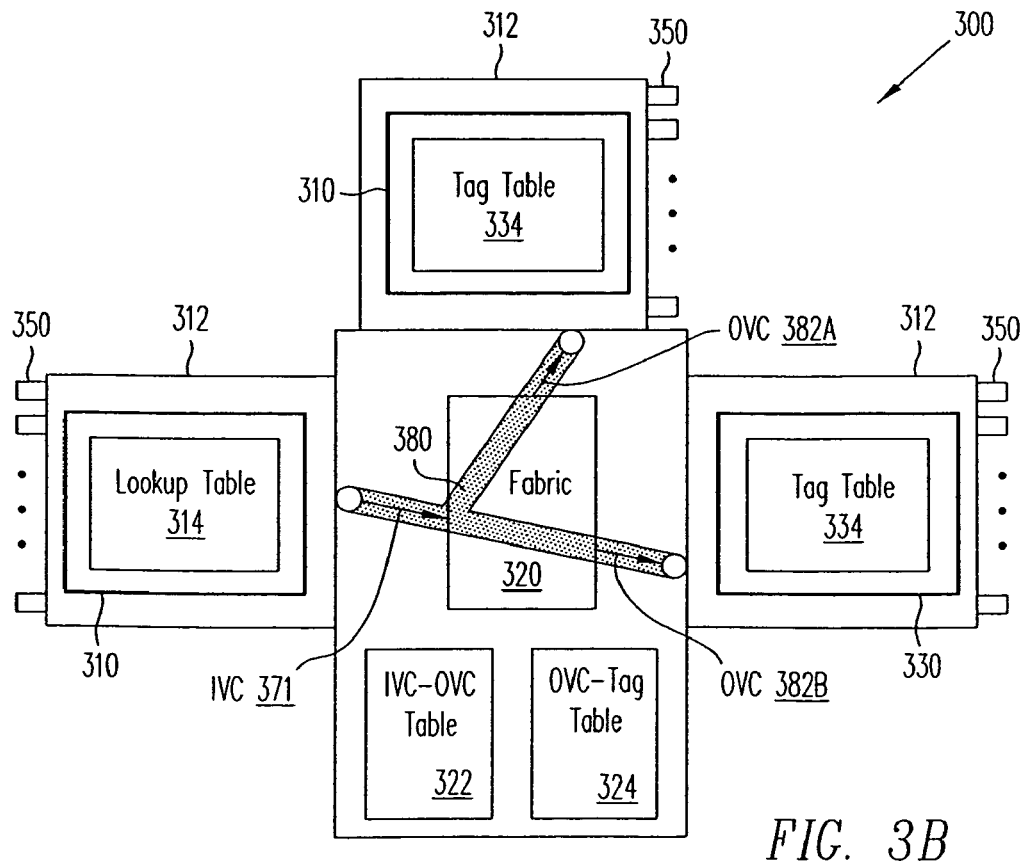
FIG. 3B is a high-level schematic of a switching device using an ATM switch fabric according to one embodiment of the present invention, showing a point to multipoint internal connection path.

FIG. 3B depicts the same ATM switching device 300, this time illustrating a point to multipoint (multicast) connection, path 380. As in FIG. 3A, the IVC portion 371 is similarly identified. However, there are a plurality of OVCs 382A, 382B, . . . to 382n, representing the plurality of destination output ports.

Ingress engine 310 also includes ingress lookup table 314, which provides the layer 2 and/or layer 3 routing function as in a convention switch. Thus, given the L2 and L3 addresses, the ingress table determines the outgoing (uplink) target interface on which to route the packet to the next switch or destination on the network. The target interface thus defines an IVC and a particular path in the switch fabric 320.

Fabric 320 includes IVC-OVC mapping table 322 and OVC tag generation table 324. The IVC-OVC mapping table is conventionally used by the control plane of switch 300 to determine the internal path through fabric 320. Rather than keep a more complicated and larger table of egress port and corresponding upload VPI/VCI information, a conventional switch maintains a simpler table of IVC values and their corresponding OVCs; this table is constructed by the control plane function and is logically considered part of the fabric, although it may physically reside anywhere within the switch. The packet passes through the fabric, its destination (egress port) is determined by the translation of the associated IVC into the proper OVC. Multicast packet replication (the "cloning" of packets to perform the point to multipoint connection illustrated in FIG. 3B) is conventionally provided by associating a plurality of OVC values with a given multicast IVC.

OVC tag generation table 324, which is also maintained and operated through the switch control plane, maps each individual OVC to a tag value. This tag value consists, in one embodiment of the present invention, of a tag type and a tag parameter (see FIG. 7 for one example of the tag value format) that encodes not only the egress packet processing requirements, but the uplink packet encapsulation. It can also include, in some embodiments, the logical destination of the packet, i.e., the egress port. The tag value is logically associated with the packet's new cell header through any of a number of means well-known in the art. (Remember that the NCH was determined at least in part by the uplink VPI/VCI determination in the ingress engine.)

It is important to note that many OVCs may be mapped to a single tag, because many different packets may still have the same egress processing requirements and associated parameters. In fact, this many-to-one possibility is what enables the efficient use of memory resources and the resulting overall improvement in packet processing.

A slightly similar, although ultimately unrelated, technique for limiting the number of VCs passing out of a switch is known in the art as "VC merge." This technique is described in Network Working Group Request for Comments (RFC) 2682, "Performance Issues in VC-Merge Capable ATM LSRs," by Indra Widjaja and Anwar Elwalid (September 1999) and the now-expired Internet Draft of "Performance Issues in VC-Merge Capable ATM LSRs" (dated October 1998). Both of these documents are incorporated herein by reference in their entireties.

VC merge operates by mapping the inter-router (but not intra-router) route information (the VPI/VCI data) to relatively short, fixed-length labels so that the next-hop router identification can be determined by direct indexing on the label. In other words, incoming VCs, though having differing VPIs and VCIs identifying the ingress route, are assigned the same short label because they are all destined for the same uplink (egress) VPI/VCI.

The present invention is a distinct and innovative variation on the label (or tag) switching concept represented by VC merge. Here, intra-router virtual circuits (i.e., the IVC) are associated with, but not mapped to, a tag value that encodes egress processing information. The tag value is not a destination or a virtual circuit or virtual path identifier at all; it is a code that enables better egress processing within the router.

Egress engine 330 also includes, in one embodiment of the present invention, tag table 334. Tag table 334 provides a look-up of the tag value associated with the NCH to determine egress processing specific to each tag. As each packet arrives on its specific OVC, egress engine 330 uses the OVC value to identify the corresponding NCH to use in the conventional packet header rewrite prior to uplinking the packet into the network. However, in the present invention, that NCH consists, in part, of the tag value. Tag table 334 allows egress engine 330 to perform a look-up using the tag value and thereby determine from a smaller, more easily scaleable table, how to process the packet. No lookup of OVC-specific processing data is required as the OVC is directly associated (via conventional mechanisms and/or logic in the control plane) with the NCH.

In an alternate embodiment, dedicated circuits and/or software functions within the egress engine 330 read the tag value directly and modify egress processing according to the tag type and tag parameter contained therein. The tag type is thus analogous to an instruction on how to process the packet, with additional parameters supplied via the tag parameter.

Specialized packet processing is thus enabled without reference to the inadequate OVC table used in the prior art. The type of processing needed and any necessary parametric inputs of constraints are supplied directly by the tag value in a form readily useable by the egress engine. As there needs only be a small number of tag values corresponding to the limited types of packet processing and encapsulation used in the ATM art (and their related and equally limited parameters), the tag approach of the present invention efficiently provides a scaleable alternative to the over constrained architectures used today.

Method of Operation

FIG. 4 shows a flowchart the conventional ingress processing procedure 400 used in all embodiments of the present invention. Procedure 400 begins on packet reception in the ingress engine, where conventional packet parsing and validation (e.g., error checking) is performed, step 410. Next, a conventional Layer 2 and/or Layer 3 look-up, based on the incoming L2 and L3 addresses is performed in step 420. The IVC for use going into the switch fabric is next determined in step 430, based on conventional factors including the destination VPI/VCI determined in step 420. The packet header is partially rewritten, step 440, enabling packet transit of the switch fabric. A conventional packet encapsulation is applied, as need by the switch fabric, in step 450 and the packet is sent into the switch fabric on the IVC, step 460.

FIG. 5 shows a flowchart egress engine processing as currently known in the art, to better illustrate the present invention by comparison. In a typical prior art ATM switch, egress processing 500 begins with determining the OVC on which the packet was received from the fabric. This determination 510 is performed by direct observation of the fabric to egress engine connection's logical identifier in the control plane.

The arriving packet OVC is next used to index an OVC table containing the results of the uplink VPI/VCI look-up performed by the ingress engine, among other information specific to each OVC. (The VPI/VCI look-up results are typically stored by the control plane in a memory space accessible by both the ingress and egress engines; part of this space is replicated into the OVC table.) This look-up (steps 520, 530, and 540) also determines the type of processing to apply to the packet and the outgoing port (i.e., the logical interface to the external network) on which to uplink the packet.

In step 550, the packet encapsulation and header are changed to reflect the uplink VPI/VCI and external network encapsulation requirements. The packet is sent out into the network in step 560.

Figure 6A:
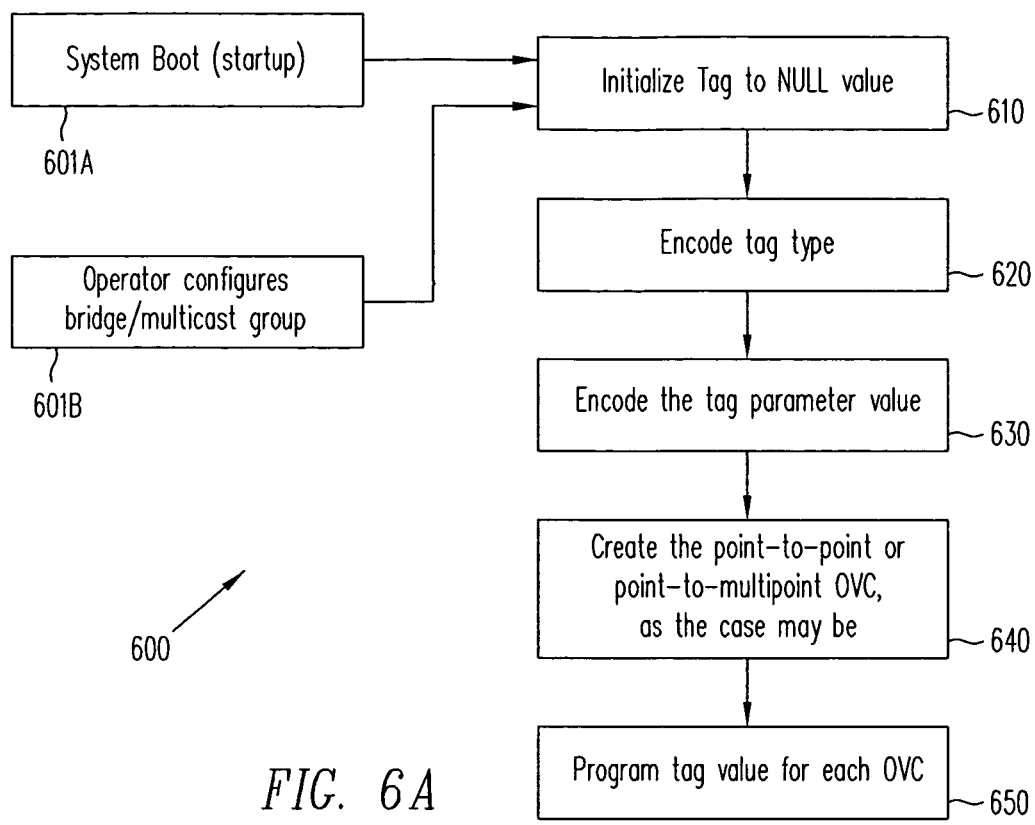
FIG. 6A is a flowchart of a method of switch control plane OVC-NCH table generation process, according to one embodiment of the present invention.

FIG. 6A shows a flowchart of the control plane OVC-NCH table generation process 600, according to one embodiment of the present invention. Process 600 begins on system boot (startup), step 601A, with the definition of static, point-to-point tag values. Alternatively, process 600 performed whenever an operator configures the system to support bridge group or multicast services, shown as step 601B.

In step 610, a new tag value is instantiated or created with a null value. The tag type field is encoded based on the type of switching to be performed, e.g., Layer 2 unicast, IP unicast, IP Multicast, etc. Information identifying the type of switching needed by the newly-received packet is contained within the packet header and may, in some instances, also be derived from the uplink interface data as well.

The tag parameter field is determined and encoded in the tag value in step 630. Table 1 lists several expected tag types and corresponding tag parameters used with each. The type of switching possible for a packet includes but is not limited to the types listed in Table 1 below. For each type of switching listed, a corresponding tag type value, in one embodiment a 4-bit code, and tag parameter (when used) is listed. The tag parameter, in one embodiment a 12-bit code, is incorporated in the tag value in the format shown in described in FIG. 7 (discussed below).

TABLE 1

| Switching Application | Tag Type | Tag Parameter |
|---|---|---|
| L2 Unicast | 0 | None |
| IP Unicast | 1 | None |
| IPX Unicast | 2 | None |
| IP Multicast | 3 | Terminating Interface ID |
| L2 Broadcast | 4 | Terminating Interface ID |
| Control Processor Data | 5 | None |
| Control Processor IPC | 6 | None |
| IP Multicast (ATM uplink) | 7 | Terminating External VC |
| L2 Broadcast (ATM uplink) | 8 | Terminating External VC |
| Reserved | 9 | None |
| Reserved | 10 | None |
| Reserved | 11 | None |
| Reserved | 12 | None |
| Reserved | 13 | None |
| Reserved | 14 | None |
| Reserved | 15 | None |

Next, the IVC-OVC mapping table is created in step 640. Here, each IVC is associated with an OVC leading to the proper egress linecard and port. Creation of the IVC-OVC table is performed by conventional means. Finally, step 650, the OVC tag generation table is populated with the tag values corresponding to each OVC. In an alternate embodiment, a single, IVC to OVC to tag value table or similar structure is maintained. One of ordinary skill in the art will recognize that many methods are known and used in the art, such as linked lists, to associate one or more values with a given index. Accordingly, the present invention is not limited to any one particular method of creating or maintaining the correspondence between a particular IVC and its associated OVC (or OVCs, in the case of multicast packets) and the tag values needed to process each OVC.

Figure 6B:
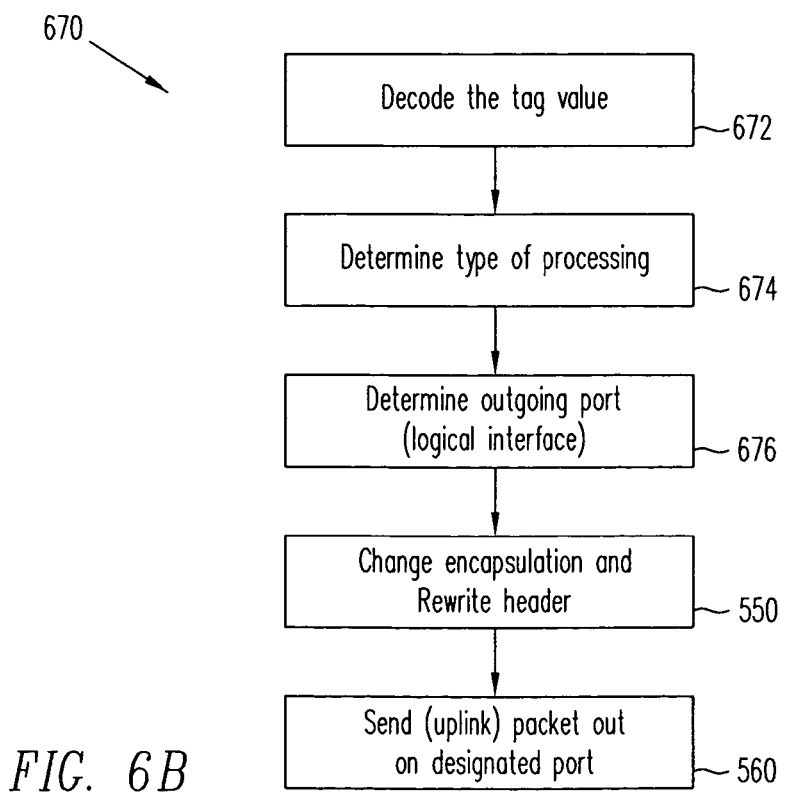
FIG. 6B is a flowchart of a method of egress engine processing, according to one embodiment of the present invention

FIG. 6B shows a flowchart of the egress engine processing flow 670, according to one embodiment of the present invention. Reference to steps numbered as in prior art FIG. 5 indicates the same functionality as in the prior art. Processing of a packet arriving at an egress engine begins with fetching and decoding the tag value associated with the OVC upon which the packet arrived, step 672.

Next, the type of processing is determined from the tag value, step 674. The type of processing may either be determined by direct inspection of the tag type field (in some embodiments) or by use of a supplemental look-up in the tag type field value. The latter approach is useful where additional flexibility and re-programmability is desirable in regard to tag type identifiers. As noted elsewhere, this additional look-up comes with a speed and memory cost. The outgoing logical interface is then either determined conventionally (as in step 540 of FIG. 5), or by direct inspection of the tag parameter field in the tag value, step 676.

Finally, in steps 550 and 560, the packet header is rewritten to reflect the uplink VPI/VCI, packet encapsulation is modified or effected as determined above, and the packet is sent out on the designated port.

FIG. 7 describes, in one embodiment, OVC tag value format 700. Field 710 contains the tag type value. Field 720 contains the tag parameter value.

Although an tag value comprised of a 12-bit tag parameter field and a 4-bit tag type field is described, one of ordinary skill in the art would appreciate that tags of virtually any size and organization are possible. Accordingly, the present invention is not limited to a tag format of any particular size or organization. Rather, the present tag format is shown for illustration only. Embodiments of the present invention encompass all such tags utilized for the purposes discussed herein.

Alternate Embodiments

The order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method comprising:
   determining a tag type based on a packet, wherein
      the tag type corresponds to a type of switching to be performed on the packet,
      the packet is sent from an ingress engine into a switch fabric, and
      the packet is received from the switch fabric at an egress engine;
   determining a tag parameter for the packet, wherein
      a value of the tag parameter is based, in part, upon the tag type;
   encoding and storing the tag type and the tag parameter in a tag value for the packet, wherein
      the encoding and storing the tag type and the tag parameter in the tag value comprises relating the tag value to an outgoing virtual circuit (OVC), and
      the OVC is configured to couple the switch fabric to the egress engine;
   reading the stored tag value corresponding to the packet; and
   processing the packet according to the stored tag value, wherein
      a type of processing is determined from a plurality of processing types using the stored tag value, and
      the processing the packet according to the stored tag value occurs in the egress engine.

2. The method of claim 1 wherein determining the tag type comprises:
   associating a switching application with the OVC; and
   relating a tag type value to the switching application.

3. The method of claim 2 wherein the switching application comprises one of:
   unicast;
   multicast; and
   broadcast.

4. The method of claim 1 wherein determining the tag parameter comprises:
   associating an optional switching parameter with the OVC; and
   relating a tag parameter value to the optional switching parameter.

5. The method of claim 1 further comprising:
   populating an OVC tag generation table with a tag value corresponding to each of a plurality of OVCs.

6. The method of claim 5 further comprising
   associating one or more OVCs with the same tag value.

7. The method of claim 5 wherein reading the stored tag value corresponding to the packet received from the switch fabric at the egress engine comprises:
   determining a transit OVC upon which the packet arrived at the egress engine; and
   referring to the OVC tag generation table for the tag value associated with the transit OVC.

8. An apparatus comprising:
   means for determining a tag type based on each packet sent from an ingress engine into a switch fabric, wherein
      the tag type corresponds to a type of switching to be performed on the packet;
   means for determining a tag parameter for each packet, wherein
      a value of the tag parameter is based, in part, upon the tag type;

means for encoding and storing the tag type and the tag parameter in a tag value for each packet, wherein
the means for encoding and storing the tag type and the tag parameter in a tag value comprises
means for relating the tag value to an outgoing virtual circuit (OVC), and
the OVC couples the switch fabric to an egress engine;
means for reading the stored tag value corresponding to each packet received from the switch fabric at the egress engine; and
means for processing each packet in the egress engine according to the stored tag value, wherein
the means for processing is determined from a plurality of processing types using the stored tag value.

9. The apparatus of claim 8, wherein the means for processing further comprises:
means for reading the tag type and the tag parameter from the stored tag value, wherein the tag type at least partially controls the egress engine.

10. The apparatus of claim 8, wherein the means for processing further comprises:
means for performing a lookup function using the stored tag value to retrieve a tag type and a tag parameter from the stored tag value, wherein the tag type at least partially controls the egress engine.

11. The apparatus of claim 10, wherein the means for processing further comprises:
means for determining an outgoing port from the tag parameter.

12. The apparatus of claim 10, wherein the tag type is an indicator of a switching method to be used by the egress engine and comprises one or more bits of data.

13. The apparatus of claim 10, wherein the tag parameter is a switching parameter optionally used by the egress engine and comprises one or more bits of data.

14. The apparatus of claim 8 wherein the means for determining the tag type comprises:
means for associating a switching application with the OVC; and
means for relating a tag type value to the switching application.

15. The apparatus of claim 8 wherein the means for determining the tag parameter comprises:
means for associating an optional switching parameter with the OVC; and
means for relating a tag parameter value to the optional switching parameter.

16. The apparatus of claim 8 further comprising:
means for populating an OVC tag generation table with a tag value corresponding to each of a plurality of OVCs.

17. The apparatus of claim 16 further comprising:
means for associating one or more OVCs with the same tag value.

18. The apparatus of claim 16 wherein the means for reading the stored tag value corresponding to the packet received from the switch fabric at an egress engine comprises:
means for determining a transit OVC upon which the packet arrived at the egress engine; and
means for referring to the OVC tag generation table for the tag value associated with the transit OVC.

19. A network element comprising:
circuitry for switching a packet received at an ingress engine through a switch fabric to an egress engine, wherein
the circuitry is operable to determine a tag type based on the packet sent from the ingress engine into the switch fabric, wherein
the tag type corresponds to a type of switching to be performed on the packet;
the circuitry is operable to determine a tag parameter for the packet, wherein
a value of the tag parameter is based, in part, upon the tag type;
the circuitry is operable to encode and store the tag type and the tag parameter in a tag value for the packet;
the circuitry is operable to read the stored tag value corresponding to the packet received from the switch fabric at an egress engine;
the circuitry is operable to process the packet in the egress engine according to the stored tag value, wherein
a type of processing is determined from a plurality of processing types using the stored tag value; and
the circuitry is operable to relate the tag value to an outgoing virtual circuit (OVC), wherein
the OVC couples the switch fabric to the egress engine.

20. The network element of claim 19 further comprising:
circuitry for switching a packet received at an ingress engine through a switch fabric to an egress engine, wherein
the circuitry is operable to perform a lookup function using the stored tag value to retrieve a tag type and a tag parameter from the stored tag value, and the tag type at least partially controls the egress engine.

21. The network element of claim 19 further comprising:
circuitry for switching a packet received at an ingress engine through a switch fabric to an egress engine, wherein
the circuitry is operable to read the tag type and the tag parameter from the stored tag value, and the tag type at least partially controls the egress engine.

22. The network element of claim 21 further comprising:
circuitry for switching a packet received at an ingress engine through a switch fabric to an egress engine, wherein
the circuitry is operable to determine an outgoing port from the tag parameter.

23. The network element of claim 21, wherein the tag type is an indicator of a switching method to be used by the egress engine and comprises one or more bits of data.

24. The network element of claim 21, wherein the tag parameter is a switching parameter optionally used by the egress engine and comprises one or more bits of data.

25. The network element of claim 19 further comprising:
circuitry for switching a packet received at an ingress engine through a switch fabric to an egress engine, wherein
the circuitry is operable to associate a switching application with the OVC; and
the circuitry is operable to relate a tag value to the switching application.

26. The network element of claim 19 further comprising:
circuitry for switching a packet received at an ingress engine through a switch fabric to an egress engine, wherein
the circuitry is operable to associate an optional switching parameter with the OVC; and
the circuitry is operable to relate a tag parameter value to the optional switching parameter.

27. The network element of claim 19 further comprising:
circuitry for switching a packet received at an ingress engine through a switch fabric to an egress engine, wherein
 the circuitry is operable to populate an OVC tag generation table with a tag value corresponding to each of a plurality of OVCs.

28. The network element of claim 27 further comprising:
circuitry for switching a packet received at an ingress engine through a switch fabric to an egress engine, wherein
 the circuitry is operable to associate one or more OVCs with the same tag value.

29. The network element of claim 27 further comprising:
circuitry for switching a packet received at an ingress engine through a switch fabric to an egress engine, wherein
 the circuitry is operable to determine a transit OVC upon which the packet arrived at the egress engine; and
 the circuitry is operable to refer to the OVC tag generation table for the tag value associated with the transit OVC.

* * * * *